US006548647B2

(12) United States Patent
Dietz et al.

(10) Patent No.: US 6,548,647 B2
(45) Date of Patent: Apr. 15, 2003

(54) PROCESS FOR PREPARING AZO COLORANTS

(75) Inventors: Erwin Dietz, Königstein (DE); Joachim Weber, Frankfurt am Main (DE); Dieter Schnaitmann, Eppstein (DE); Christian Wille, Weinheim (DE); Leonhard Unverdorben, Nidderau (DE); Klaus Saitmacher, Kriftel (DE); Jörg Jung, Flörsheim (DE); Kristina Schiffer, Bad Homburg (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/972,102

(22) Filed: Oct. 5, 2001

(65) Prior Publication Data

US 2002/0055619 A1 May 9, 2002

(30) Foreign Application Priority Data

Oct. 5, 2000 (DE) ......................... 100 49 200

(51) Int. Cl.$^7$ ............................. C09B 41/00
(52) U.S. Cl. ..................................... 534/582
(58) Field of Search .......................... 534/582

(56) References Cited

U.S. PATENT DOCUMENTS

| 4,920,206 A | 4/1990 | Behringer et al. ......... 534/582 |
| 4,994,561 A | 2/1991 | Joswig et al. ............. 534/582 |
| 5,502,171 A | 3/1996 | Raue et al. ............... 534/579 |
| 5,534,328 A | 7/1996 | Ashmead et al. .......... 428/166 |
| 5,578,711 A | 11/1996 | Raue et al. .............. 534/579 |
| 5,811,062 A | 9/1998 | Wegeng et al. ........... 422/129 |

FOREIGN PATENT DOCUMENTS

| DE | 39 26 466 | 2/1991 |
| EP | 0 244 686 | 11/1987 |
| EP | 0 446 731 | 9/1991 |
| GB | 1507595 | 4/1978 |
| WO | 01/59013 | 8/2001 |

OTHER PUBLICATIONS

U.S. application Ser. No. 09/971,495, filed Oct. 5, 2001, Dietz, et al.
U.S. application Ser. No. 09/971,496, filed Oct. 5, 2001, Dietz, et al.
U.S. application Ser. No. 09/972,082, filed Oct. 5, 2001, Dietz, et al.
EPO search report for application No. 01122054, mail date Jan. 30, 2002.
U.S. application Ser. No. 09/780,218, filed Feb. 9, 2001, Nickel, et al.
U.S. application ser. No. 09/894,342, filed Jun. 28, 2001, Nickel, et al.
XP–001058349 Dr. Bernd Penth, "New non–clogging microreactor for chemical processing and nano materials", 2000, p. 401–405.
English abstract translation of DE 39 26 466, Feb. 14, 1991.

*Primary Examiner*—Flona T. Powers
(74) *Attorney, Agent, or Firm*—Anthony A. Bisulca

(57) ABSTRACT

The invention provides a process for preparing azo colorants which comprises spraying one or more coupling components individually or in a mixture and one or more compatible diazonium salts individually or in a mixture, in their solution or suspension form through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting product solution or suspension and the gas or the evaporated liquid being removed from the reactor through a further opening in the housing by means of overpressure on the gas entry side or underpressure on the product and gas exit side.

21 Claims, No Drawings

PROCESS FOR PREPARING AZO COLORANTS

BACKGROUND OF THE INVENTION

The present invention describes an environment-friendly and economic process for preparing azo colorants.

In the context of the present invention, azo colorants are those azo dyes and azo pigments that are prepared by azo coupling reaction from a diazonium salt and a CH-acidic compound, referred to inter alia as coupling component hereinbelow (Ullmann's Encyclopedia of Industrial Chemistry, Sixth Edition, "Azo Dyes" and "Azo Pigments"; and DIN 55943). Industrially, they are conventionally prepared by the batch process. Descriptions have also been given of continuous mixing processes in mixing nozzles and continuous flow reactors (in EP-A-0 244 686, for example).

A feature common to these processes is the need for precise monitoring and control of the process parameters: for example, temperature, time, mixing, and colorant concentration—the suspension concentration in the case of azo pigments, for example—are critical to the yield, quality consistency, and coloristic and fastness properties of the resulting azo colorants. In addition, in the case of batch processes, the scaleup of new products from laboratory to industrial scales is complex and may cause difficulties, since, for example, tank and stirrer geometries or heat transitions may greatly affect the azo pigment particle size and its distribution, and the coloristic properties.

It was an object of the present invention to find an environment-friendly, economic, technically reliable, and cost-effective process for preparing azo colorants by the azo coupling reaction, said process being universally suitable for the preparation both of azo pigments and of azo dyes; providing optimum mixing of the reactants; being combinable where appropriate with the measures known in connection with the preparation of azo colorants, such as the use of solvents or auxiliaries; permitting the desired process parameters to be maintained very constantly; and allowing easy scaleup.

The conduct of certain chemical reactions in microreactors is known (from DE-A-3 926 466, for example). Microreactors are constructed, for example, from stacks of grooved plates with microchannels and are described in DE 39 26 466 C2 and U.S. Pat. No. 5,534,328. U.S. Pat. No. 5,811,062 notes that microreactors are used preferentially for reactions which do not require or produce solids, since the microchannels easily become clogged.

SUMMARY OF THE INVENTION

It has now been found that the object of the invention may be achieved, surprisingly, through the use of a microjet reactor.

The present invention provides a process for preparing azo colorants which comprises spraying the reactants, i.e. the coupling component and the diazonium salt, in their solution or suspension form through nozzles to a point of conjoint collision in a reactor chamber enclosed by a housing in a microjet reactor, appropriately via one or more pumps, preferably high-pressure pumps, a gas or an evaporating liquid being passed into the reactor chamber through an opening in the housing for the purpose of maintaining a gas atmosphere in the reactor chamber, especially at the point of collision of the jets, and where appropriate of effecting cooling as well, and the resulting product solution or suspension and the gas or the evaporated liquid being removed from the reactor through a further opening in the housing by means of overpressure on the gas entry side or underpressure on the product and gas exit side.

DESCRIPTION OF THE PREFERRED EMBODIMENTS

Preparation of azo colorants in accordance with the invention requires intensive, rapid, uniform, and reproducible mixing of the reactants. This is brought about by spraying the reactants used into the reactor chamber under a pressure of at least 10 bar, preferably at least 50 bar, in particular from 50 to 5000 bar.

In order to prevent material wear on the inner surfaces of the housing, the collision point is shifted into the material-remote gas space. By "material-remote" here is meant that, in the vicinity of the collision point of the jets, a gas atmosphere is maintained by means of the introduced gas or evaporating liquid. This means that the collision point at which the jets impinge on one another is not sited on a vessel wall or on a pipe wall. This prevents the material wear that would occur at the point where cavitation takes place on material walls. Cavitation occurs particularly when using high pressures, especially at pressures above 3000 bar. Moreover, the colliding jets are not braked by the gas atmosphere prior to their collision, as would be the case, for example, if they had to pass through a liquid.

The material of the nozzles should be as hard and thus low-wearing as possible; examples of suitable materials include ceramics, such as oxides, carbides, nitrides or mixed compounds thereof, with preference being given to the use of aluminum oxide, particularly in the form of sapphire or ruby, although diamond is also particularly suitable. Suitable hard substances also include metals, especially hardened metals. The bores of the nozzles have diameters of less than 2 mm, preferably less than 0.5 mm and in particular less than 0.4 mm.

The microjet reactor may be configured in principle as a two-jet, three-jet or multijet reactor, preference being given to the two-jet configuration. In the case of an arrangement with two jets, the jets preferably strike one another frontally (180° angle between the jets); in the case of a three-jet arrangement, an angle of 120° between the jets is appropriate. The jets advantageously may be mounted in a device which can be adjusted to the point of conjoint collision. As a result of these different embodiments it is possible, for example, to realize different volume ratios of the diazonium salt and coupling component solutions or suspensions which are required for the reaction.

In one particularly preferred embodiment of the process of the invention, the coupling component solution or suspension and the diazonium salt solution or suspension are sprayed against one another frontally through two opposed nozzles by means of two high-pressure pumps. A further particularly preferred embodiment of the process of the invention is a three-jet reactor in which, for example, by means of a high-pressure pump the diazonium salt solution or suspension is sprayed to the point of conjoint collision through one nozzle and by means of a second high-pressure pump the coupling component solution or suspension is sprayed to the same point through two nozzles.

In another preferred embodiment, the diazonium salt or suspension is sprayed to a point of conjoint collision through 1, 2 or more nozzles, preferably through one nozzle, and independently thereof the coupling component solution or suspension is sprayed to the same point through 1, 2 or more nozzles, preferably through 1, 2 or 3 nozzles.

The nozzle of the diazonium salt solution or suspension and that of the coupling component solution or suspension may have different diameters. The nozzle through which the diazonium salt is sprayed appropriately has a diameter which is from 0.2 to 5 times, preferably from 0.3 to 3 times, that of the nozzle through which the coupling component is sprayed.

The temperatures of the reactants are normally from −10 to +90° C., preferably from −5 to +80° C., particularly from 0 to 70° C. It is also possible to operate under pressure at above the boiling point of the liquid medium.

Where necessary, the introduced gas or the evaporating liquid that is used to maintain the gas atmosphere in the inside of the housing may be used for cooling. Additionally, an evaporating cooling liquid or a cooling gas may be introduced into the reactor chamber by way of an additional bore in the housing. The aggregate state of the cooling medium may be conditioned by temperature and/or pressure. The medium in question may comprise, for example, air, nitrogen, carbon dioxide or other, inert gases or liquids having an appropriate boiling point under increased pressure. It is possible here for the transition of the cooling medium from the liquid to the gaseous state to take place in the reactor itself by virtue of the fact that heat released in the course of the precipitation brings about the change in aggregate state. It is also possible for the evaporative cooling of an expanding gas to be utilized for cooling. The housing enclosing the reactor chamber may also be constructed in such a way that it is thermostatable and may be used for cooling; or else the product may be cooled after it has exited the housing. The pressure in the reactor chamber may, for example, be set and maintained by means of a pressure maintenance valve, so that the gas used is present in the liquid or supercritical or subcritical state. Thus it is possible, for example, to utilize the evaporative cooling of a gas.

If operation is to take place at elevated temperature, the energy required for heating may be supplied prior to the emergence from the nozzles of the reactants—for example, in the supply lines—or by way of the thermostatable housing or the introduced gas. In principle, owing to the high pressures in the high-pressure lances, the chosen temperature may. also be situated a considerable way above the boiling point of the liquid medium. Suitable liquid media therefore include those which, at the temperature of reaction in the interior of the housing under atmospheric pressure, are present as gases. The reactants may also differ in temperature.

The process of the invention is suitable for all azo colorants which can be prepared by azo coupling reaction: for example, for azo pigments from the series of the monoazo pigments, disazo pigments, β-naphthol and Naphtol AS pigments, laked azo pigments, benzimidazolone pigments, disazo condensation pigments and metal complex azo pigments; and for azo dyes from the series of the cationic, anionic, and nonionic azo dyes, especially monoazo, disazo and polyazo dyes, formazan dyes and other metal complex azo dyes, and anthraquinone azo dyes.

The process of the invention also relates to the preparation of precursors of the actual azo colorants by azo coupling reaction. By means of the process of the invention it is possible, for example, to prepare precursors for laked azo colorants, i.e., lakeable azo colorants, for diazo condensation pigments, i.e., monoazo colorants which can be linked via a bifunctional group or, for example, disazo colorants which can be extended via an acid chloride intermediate, for formazan dyes, or other heavy metal azo dyes, examples being copper, chromium, nickel or cobalt azo dyes, i.e., azo colorants which can be complexed with heavy metals (see also "The Chemistry of Synthetic Dyes", K. Venkataraman, Academic Press).

The azo dyes comprise in particular the alkali metal salts or ammonium salts of the reactive dyes and also of the acid wool dyes or substantive cotton dyes of the azo series. Azo dyes under consideration include preferably metal-free and metalizable monoazo, disazo, and polyazo dyes, and azo dyes containing one or more sulfonic acid groups.

Among the azo colorants which can be prepared by the process of the invention, and the azo colorant precursors which can be prepared by the process of the invention, the compounds involved in the case of the azo pigments include in particular C.I. Pigment Yellow 1, 3, 12, 13, 14, 16, 17, 65, 73, 74, 75, 81, 83, 97, 98, 106, 111, 113, 114, 120, 126, 127, 150, 151, 154, 155, 174, 175, 176, 180, 181, 183, 191, 194, 198, 213; Pigment Orange 5, 13, 34, 36, 38, 60, 62, 72, 74; Pigment Red 2, 3, 4, 8, 9, 10, 12, 14, 22, 38, 48:1–4, 49:1, 52:1–2, 53:1–3, 57:1, 60, 60:1, 68, 112, 137, 144, 146, 147, 170, 171, 175, 176, 184, 185, 187, 188, 208, 210, 214, 242, 247, 253, 256, 262, 266; Pigment Violet 32; Pigment Brown 25; and, if desired, their precursors which are prepared by azo coupling reaction.

In the case of the azo dyes, the compounds involved comprise, in particular, C.I. Reactive Yellow 15, 17, 23, 25, 27, 37, 39, 42, 57, 82, 87, 95, 111, 125, 142, 143, 148, 160, 161, 165, 168, 176, 181, 205, 206, 207, 208; Reactive Orange 7, 11, 12, 13, 15, 16, 30, 35, 64, 67, 69, 70, 72, 74, 82, 87, 91, 95, 96, 106, 107, 116, 122, 131, 132, 133; Reactive Red 2, 21, 23, 24, 35, 40, 49, 55, 56, 63, 65, 66, 78, 84, 106, 112, 116, 120, 123, 124, 136, 141, 147, 152, 158, 159, 174, 180, 181, 183, 184, 190, 197, 200, 201, 218, 225, 228, 235, 238, 239, 242, 243, 245, 264, 265, 266, 267, 268, 269; Reactive Violet 2, 5, 6, 23, 33, 36, 37; Reactive Blue 19, 28, 73, 89, 98, 104, 113, 120,122, 158, 184,193, 195, 203, 213, 214, 225, 238, 264, 265, 267; Reactive Green 32; Reactive Brown 11, 18, 19, 30, 37; Reactive Black 5, 13, 14, 31, 39, 43; Disperse Yellow 3, 23, 60, 211, 241; Disperse Orange 1:1, 3, 21, 25, 29, 30, 45, 53, 56, 80, 66, 138, 149; Disperse Red 1, 13, 17, 50, 56, 65, 82, 106, 134, 136, 137, 151, 167, 167:1, 169, 177, 324, 343, 349, 369, 376; Disperse Blue 79, 102, 125, 130, 165, 165:1, 165:2, 287, 319, 367; Disperse Violet 40, 93, 93:1, 95; Disperse Brown 1, 4:1; Basic Yellow 19; Basic Red 18, 18:1, 22, 23, 24, 46, 51, 54, 115; Basic Blue 41, 149; Mordant Yellow 8, 30; Mordant Red 7, 26, 30, 94; Mordant Blue 9, 13, 49; Mordant Brown 15; Mordant Black 7, 8, 9, 11, 17, 65; Acid Yellow 17, 19, 23, 25, 59, 99, 104, 137, 151, 155, 169, 197, 219, 220, 230, 232, 240, 242, 246, 262; Acid Orange 7, 67, 74, 94, 95, 107, 108, 116, 162, 166; Acid Red 1, 14, 18, 27, 52, 127, 131, 151, 154, 182, 183, 194, 195, 211, 249, 251, 252, 260, 299, 307, 315, 316, 337, 360, 361, 405, 407, 414, 425, 426, 439, 446, 447; Acid Blue 113, 156, 158, 193, 199, 229, 317, 351; Acid Green 73, 109; Acid Brown 172, 194, 226, 289, 298, 413, 415; Acid Black 24, 52, 60, 63, 63:1, 107, 140, 172, 207, 220; Direct Yellow 27, 28, 44, 50, 109, 110, 137, 157, 166, 169; Direct Orange 102, 106; Direct Red 16, 23, 79, 80, 81, 83, 83:1, 84, 89, 212, 218, 227, 239, 254, 262, 277; Direct Violet 9, 47, 51, 66, 95; Direct Blue 71, 78, 94, 98, 225, 229, 244, 290, 301, 312; Direct Green 26, 28, 59; Direct Black 19, 22, 51, 56, 112, 113, 122; and, if desired, their precursors prepared by azo coupling reaction.

In the process of the invention, it is appropriate to supply the reactants in the form of aqueous solutions or suspensions, and preferably in equivalent amounts, to the microjet reactor.

The azo coupling reaction takes place preferably in aqueous solution or suspension, although it is also possible to use organic solvents, alone or as a mixture with water; by way of example, alcohols having from 1 to 10 carbon atoms, examples being methanol, ethanol, n-propanol, isopropanol, butanols, such as n-butanol, sec-butanol, and tert-butanol, pentanols, such as n-pentanol and 2-methyl-2-butanol, hexanols, such as 2-methyl-2-pentanol and 3-methyl-3-pentanol, 2-methyl-2-hexanol, 3-ethyl-3-pentanol, octanols, such as 2,4,4-trimethyl-2-pentanol, and cyclohexanol; or glycols, such as ethylene glycol, diethylene glycol, propylene glycol, dipropylene glycol, or glycerol; polyglycols, such as polyethylene glycols or polypropylene glycols; ethers, such as methyl isobutyl ether, tetrahydrofuran or dimethoxyethane; glycol ethers, such as monomethyl or monoethyl ethers of ethylene glycol or propylene glycol, diethylene glycol monomethyl ether, diethylene glycol monoethyl ether, butyl glycols or methoxybutanol; ketones, such as acetone, diethyl ketone, methylisobutyl ketone, methyl ethyl ketone or cyclohexanone; aliphatic acid amides, such as formamide, dimethylformamide, N-methylacetamide or N,N-dimethylacetamide; urea derivatives, such as tetramethylurea; or cyclic carboxamides, such as N-methylpyrrolidone, valerolactam or caprolactam; esters, such as carboxylic acid $C_1$–$C_6$ alkyl esters, such as butyl formate, ethyl acetate or propyl propionate; or carboxylic acid $C_1$–$C_6$ glycol esters; or glycol ether acetates, such as 1-methoxy-2-propyl acetate; or phthalic or benzoic acid $C_1$–$C_6$ alkyl esters, such as ethyl benzoate; cyclic esters, such as caprolactone; nitriles, such as acetonitrile or benzonitrile; aliphatic or aromatic hydrocarbons, such as cyclohexane or benzene; or alkyl-, alkoxy-, nitro- or halo-substituted benzene, such as toluene, xylenes, ethylbenzene, anisole, nitrobenzene, chlorobenzene, o-dichlorobenzene, 1,2,4-trichlorobenzene or bromobenzene; or other substituted aromatics, such as benzoic acid or phenol; aromatic heterocycles, such as pyridine, morpholine, picoline or quinoline; and also hexamethylphosphoramide, 1,3-dimethyl-2-imidazolidinone, dimethyl sulfoxide, and sulfolane. Said solvents may also be used as mixtures. Preference is given to using water-miscible solvents.

Reactants used for the azo coupling reaction are diazonium salts of aromatic or hetaromatic amines, such as, for example, aniline, 2-nitroaniline, methyl anthranilate, 2,5-dichloroaniline, 2-methyl-4-chloroaniline, 2-chloroaniline, 2-trifluoromethyl-4-chloroaniline, 2,4,5-trichloroaniline; 3-amino-4-methylbenzamide, 2-methyl-5-chloroaniline, 4-amino-3-chloro-N'-methylbenzamide, o-toluidine, o-dianisidine, 2,2',5,5'-tetrachlorobenzidine, 2-amino-5-methylbenzenesulfonic acid, and 2-amino-4-chloro-5-methylbenzenesulfonic acid.

Of particular interest for azo pigments are the following amine components:

4-methyl-2-nitrophenylamine, 4-chloro-2-nitrophenylamine, 3,3'-dichlorobiphenyl-4,4'-diamine, 3,3'-dimethylbiphenyl-4,4'-diamine, 4-methoxy-2-nitrophenylamine, 2-methoxy-4-nitrophenylamine, 4-amino-2,5-dimethoxy-N-phenylbenzenesulfonamide, dimethyl 5-aminoisophthalate, anthranilic acid, 2-trifluoromethylphenylamine, dimethyl 2-aminoterephthalate, 1,2-bis(2-aminophenoxy)ethane, 2-amino-4-chloro-5-methylbenzenesulfonic acid, 2-methoxyphenylamine, 4-(4-aminobenzoyl-amino) benzamide, 2,4-dinitrophenylamine, 3-amino-4-chlorobenzamide, 3-amino-4-chlorobenzoic acid, 4-nitrophenylamine, 2,5-dichlorophenylamine, 4-methyl-2-nitrophenylamine, 2-chloro-4-nitrophenylamine, 2-methyl-5-nitrophenylamine, 2-methyl-4-nitrophenylamine, 2-methyl-5-nitrophenylamine, 2-amino-4-chloro-5-methylbenzenesulfonic acid, 2-aminonaphthalene-1-sulfonic acid, 2-amino-5-chloro-4-methylbenzenesulfonic acid, 2-amino-5-chloro-4-methylbenzenesulfonic acid, 2-amino-5-methylbenzenesulfonic acid, 2,4,5-trichlorophenylamine, 3-amino-4-methoxy-N-phenylbenzamide, 4-aminobenzamide, methyl 2-aminobenzoate, 4-amino-5-methoxy-2,N-dimethylbenzenesulfonamide, monomethyl 2-amino-N-(2,5-dichlorophenyl)terephthalate, butyl 2-aminobenzoate, 2-chloro-5-trifluoromethyl-phenylamine, 4-(3-amino-4-methylbenzoylamino)benzenesulfonic acid, 4-amino-2,5-dichloro-N-methylbenzenesulfonamide, 4-amino-2,5-dichloro-N,N-dimethyl-benzenesulfonamide, 6-amino-1 H-quinazoline-2,4-dione, 4-(3-amino-4-methoxybenzoylamino)benzamide, 4-amino-2,5-dimethoxy-N-methylbenzenesulfonamide, 5-aminobenzimidazolone, 6-amino-7-methoxy-1,4-dihydroquinoxaline-2,3-dione, 2-chloroethyl 3-amino4-methylbenzoate, isopropyl 3-amino-4-chlorobenzoate, 3-amino4-chlorobenzotrifluoride, n-propyl 3-amino-4-methylbenzoate, 2-aminonaphthalene-3,6,8-trisulfonic acid, 2-aminonaphthalene-4,6,8-trisulfonic acid, 2-aminonaphthalene-4,8-disulfonic acid, 2-aminonaphthalene-6,8-disulfonic acid, 2-amino-8-hydroxynaphthalene-6-sulfonic acid, 1-amino-8-hydroxynaphthalene-3,6-disulfonic acid, 1-amino-2-hydroxybenzene-5-sulfonic acid, 1-amino-4-acetylaminobenzene-2-sulfonic acid, 2-aminoanisole, 2-aminomethoxybenzene-ω-methanesulfonic acid, 2-aminophenol-4-sulfonic acid, o-anisidine-5-sulfonic acid, 2-(3-amino-1,4-dimethoxybenzenesulfonyl)ethyl sulfate, and 2-(1-methyl-3-amino4-methoxybenzenesulfonyl)ethyl sulfate.

The following amine components are of particular interest for azo dyes:

2-(4-aminobenzenesulfonyl)ethyl sulfate, 2-(4-amino-5-methoxy-2-methylbenzene-sulfonyl)ethyl sulfate, 2-(4-amino-2,5-dimethoxybenzenesulfonyl)ethyl sulfate, 2-[4-(5-hydroxy-3-methylpyrazol-1-yl)benzenesulfonyl] ethyl sulfate, 2-(3-amino4-methoxybenzenesulfonyl) ethyl sulfate, and 2-(3-aminobenzenesulfonyl)ethyl sulfate.

The following coupling components are of particular interest for azo pigments:

acetoacetarylides of the formula (I)

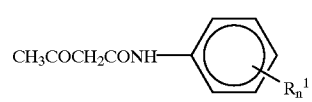

(I)

where n is a number from 0 to 3, and $R_1$ can be a $C_1$–$C_4$-alkyl group, such as methyl or ethyl; a $C_1$–$C_4$-alkoxy group, such as methoxy or ethoxy; a trifluoromethyl group; a nitro group; a halogen atom such as fluorine, chlorine or bromine; a $NHCOCH_3$ group; an $SO_3H$ group; a group $SO_2NR^{10}R^{11}$ where $R^{10}$ and $R^{11}$ are identical or different and are hydrogen or $C_1$–$C_4$ alkyl; a group $COOR^{10}$ where $R^{10}$ is as defined above; or a group $COONR^{12}R^{13}$ where $R^{12}$ and $R^{13}$ independently are hydrogen, $C_1$–$C_4$ alkyl or phenyl, the phenyl ring being substituted by one, two or three identical or different substituents from the group consisting of $C_1$–$C_4$ alkyl, $C_1$–$C_4$ alkoxy, trifluoromethyl, nitro, halogen, $COOR^{10}$, $R^{10}$ being as defined above, and $COONR^{10}R^{11}$, $R^{10}$ and $R^{11}$ being identical or different and being as defined above, and where $n>1 R^1$ may be identical or different;

2-hydroxynaphthalenes of the formula (II),

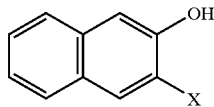

(II)

where

X is hydrogen, a COOH group or a group of the formula (III), (VI) or (VII);

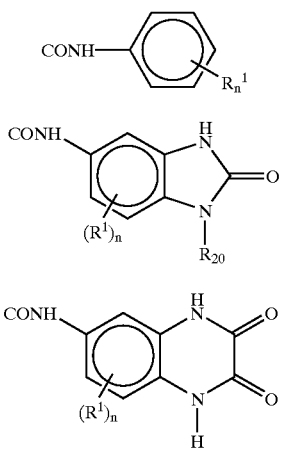

(III)

(VI)

(VII)

where n and $R^1$ are as defined above; and
$R^{20}$ is hydrogen, methyl or ethyl;

Bisacetoacetylated diaminophenyls and -biphenyls, N,N'-Bis(3-hydroxy-2-naphthoyl)phenylenediamines, in which the phenyl or biphenyl ring system may be unsubstituted or substituted by 1, 2, 3 or 4 identical or different radicals $CH_3$, $C_2H_5$, $OCH_3$, $OC_2H_5$, $NO_2$, F, Cl, $CF_3$;

Acetoacetarylides of dinuclear heterocycles of the formula (IV),

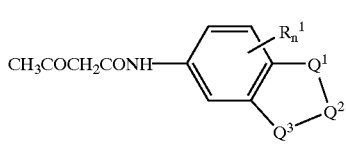

(IV)

where n and $R^1$ are as defined above, $Q^1$, $Q^2$ and $Q^3$ may be identical or different and are N, $NR^2$, CO, N—CO, $NR^2$—CO, CO—N, CO—$NR^2$, CH, N—CH, $NR^2$—CH, CH—N, CH—$NR^2$, $CH_2$, N—$CH_2$, $NR^2$—$CH_2$, $CH_2$—N, $CH_2$—$NR^2$ or $SO_2$, where $R^2$ is a hydrogen atom; is a $C_1$–$C_4$ alkyl group, such as methyl or ethyl; or is a phenyl group which may be unsubstituted or substituted one or more times by halogen, $C_1$–$C_4$ alkyl, $C_1$–$C_4$ alkoxy, trifluoromethyl, nitro, cyano, with the proviso that the combination of $Q^1$, $Q^2$ and $Q^3$ with the two carbon atoms of the phenyl ring results in a saturated or unsaturated, five- or six-membered ring; preferably acetoacetarylides of the formula (VIa) and (VIIa),

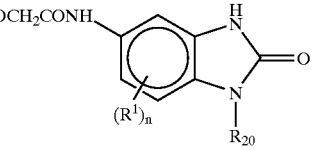

(VIa)

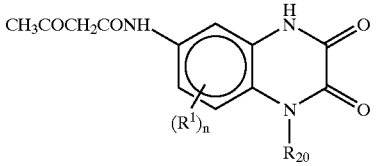

(VIIa)

where $R^1$ and n are as defined above and $R^{20}$ is hydrogen, methyl or ethyl;

and also pyrazolones of the formula (V),

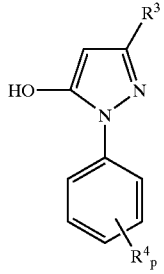

(V)

where $R^3$ is a $CH_3$, $COOCH_3$ or $COOC_2H_5$ group,
$R^4$ is a $CH_3$ or $SO_3H$ group or a chlorine atom, and
p is a number from 0 to 3,
and where $p>1 R^4$ may be identical or different.

The following coupling components are of particular interest for azo dyes:

4-[5-hydroxy-3-methylpyrazol-1-yl]benzenesulfonic acid, 2-aminonaphthalene-1,5-disulfonic acid, 5-methoxy-2-methyl-4-[3-oxobutyrylamino] benzenesulfonic acid, 2-methoxy-5-methyl-4-[3-oxobutyrylamino]benzenesulfonic acid, 4-acetylamino-2-aminobenzenesulfonic acid, 4-[4-chloro-6-(3-sulfophenylamino)-[1,3,5]-triazin-2-yl-amino]-5-hydroxynaphthalene-2,7-disulfonic acid, 4-acetylamino-5-hydroxy-naphthalene-2,7-disulfonic acid, 4-amino-5-hydroxynaphthalene-2,7-disulfonic acid, 5-hydroxy-1-[4-sulfophenyl]-1H-pyrazole-3-carboxylic acid, 2-aminonaphthalene-6,8-disulfonic acid, 2-amino-8-hydroxynaphthalene-6-sulfonic acid, 1-amino-8-hydroxynaphthalene-3,6-disulfonic acid, 2-aminoanisole, 2-aminomethoxy-benzene-ω-methanesulfonic acid, and 1,3,5-trishydroxybenzene.

In the process of the invention for preparing azo colorants it is also possible to use the auxiliaries that are employed in the conventional processes, such as surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, light stabilizers, or a combination thereof. The auxiliaries may be added at any point in time before, during or after the reaction in the microjet reactor, all at once or in several portions. The auxiliaries may, for example, be added prior to injection to the reactant solutions or suspensions, or else during the reaction in liquid, dissolved or suspended form, by means of a separate jet, by injection into the collision point.

The overall amount of the added auxiliaries may amount to from 0 to 40% by weight, preferably from 1 to 30% by weight, in particular from 2.5 to 25% by weight, based on the azo colorant.

Suitable surfactants include anionic or anion-active, cationic or cation-active, and nonionic substances or mixtures of these agents. Preference is given to those surfactants or surfactant mixtures which do not foam in the course of the collision.

Examples of suitable anion-active substances include fatty acid taurides, fatty acid N-methyltaurides, fatty acid isethionates, alkylphenylsulfonates, alkylnaphthalenesulfonates, alkylphenol polyglycol ether sulfates, fatty alcohol polyglycol ether sulfates, fatty acid amide polyglycol ether sulfates, alkyl sulfosuccinamates, alkenylsuccinic monoesters, fatty alcohol polyglycol ether sulfosuccinates, alkanesulfonates, fatty acid glutamates, alkyl sulfosuccinates, fatty acid sarcosides; fatty acids, such as palmitic, stearic, and oleic acid; soaps, such as alkali metal salts of fatty acids, naphthenic acids and resin acids, such as abietic acid; alkali-soluble resins, examples being rosin-modified maleate resins, and condensation products based on cyanuric chloride, taurine, N,N'-diethylaminopropylamine, and p-phenylenediamine. Particular preference is given to resin soaps, i.e., alkali metal salts of resin acids.

Examples of suitable cation-active substances include quaternary ammonium salts, fatty amine alkoxylates, alkoxylated polyamines, fatty amine polyglycol ethers, fatty amines, diamines and polyamines derived from fatty amines or fatty alcohols, and their alkoxylates, imidazolines derived from fatty acids, and salts of these cation-active substances, such as acetates, for example.

Examples of suitable nonionic substances include amine oxides, fatty alcohol polyglycol ethers, fatty acid polyglycol esters, betaines, such as fatty acid amide N-propyl betaines, phosphoric esters of aliphatic and aromatic alcohols, fatty alcohols or fatty alcohol polyglycol ethers, fatty acid amide ethoxylates, fatty alcohol-alkylene oxide adducts, and alkylphenol polyglycol ethers.

By nonpigmentary dispersants are meant substances which structurally are not derived by chemical modification from organic pigments. They are added as dispersants either during the actual preparation of pigments, or else often during the incorporation of the pigments into the application media to be colored; for example in the preparation of paints or printing inks, by dispersion of the pigments into the corresponding binders. They may be polymeric substances, examples being polyolefins, polyesters, polyethers, polyamides, polyimines, polyacrylates, polyisocyanates, block copolymers thereof, copolymers of the corresponding monomers; or polymers of one class modified with a few monomers from another class. These polymeric substances carry polar anchor groups such as hydroxyl, amino, imino, and ammonium groups, for example, carboxylic acid groups and carboxylate groups, sulfonic acid groups and sulfonate groups, or phosphonic acid groups and phosphonate groups, and may also be modified with aromatic, nonpigmentary substances. Nonpigmentary dispersants may also, furthermore, be aromatic substances chemically modified with functional groups and not derived from organic pigments. Nonpigmentary dispersants of this kind are known to the skilled worker, and some are available commercially (e.g., Solsperse®, Avecia; Disperbyk®, Byk, Efka®, Efka). Although several types will be mentioned below to give a representation, it is possible in principle to employ any other substances described, examples being condensation products of isocyanates and alcohols, diols or polyols, amino alcohols or diamines or polyamines, polymers of hydroxycarboxylic acids, copolymers of olefin monomers or vinyl monomers and ethylenically unsaturated carboxylic acids/esters, urethane-containing polymers of ethylenically unsaturated monomers, urethane-modified polyesters, condensation products based on cyanuric halides, polymers containing nitroxyl compounds, polyester amides, modified polyamides, modified acrylic polymers, comb dispersants comprising polyesters and acrylic polymers, phosphoric esters, triazine-derived polymers, modified polyethers, or dispersants derived from aromatic nonpigmentary substances. These basic structures are in many cases modified further, by means for example of chemical reaction with further substances carrying functional groups or by salt formation.

By pigmentary dispersants are meant pigment dispersants which are derived from an organic pigment as the parent structure and are prepared by chemically modifying this parent structure; examples include saccharin-containing pigment dispersants, piperidyl-containing pigment dispersants, naphthalene- or perylene-derived pigment dispersants, pigment dispersants containing functional groups linked to the pigment parent structure via a methylene group, pigment parent structures chemically modified with polymers, pigment dispersants containing sulfo acid groups, pigment dispersants containing sulfonamide groups, pigment dispersants containing ether groups, or pigment dispersants containing carboxylic acid, carboxylic ester or carboxamide groups.

Since compliances with a desired pH during and after the reaction is often critical to the quality, it is possible, upstream of the injection nozzles or else by sprayed injection of a separate jet into the collision point, to supply buffer solutions, preferably of organic acids and their salts, such as formic acid/formate buffer, acetic acid/acetate buffer, and citric acid/citrate buffer, for example; or of inorganic acids and their salts, such as phosphoric acid/phosphate buffer or carbonic acid/carbonate or hydrogen carbonate buffer, for example.

For the reactants, auxiliaries or buffer solutions it is also possible to use different jet reaches or a different number of jets and so to realize, for example, different volume proportions that are required. With the process of the invention it is also possible, through the use of more than one diazonium salt and/or more than one coupling component, to prepare mixtures or else, in the case of solid products, mixed crystals of azo colorants. In this case the reactants may be injected as a mixture or separately.

The azo colorant is preferably isolated directly following reaction. However, it is also possible to carry out an aftertreatment (finish) with water and/or an organic solvent, at temperatures for example from 20 to 250° C., with or without the addition of auxiliaries.

It was surprising and was not foreseeable that the environmentally unproblematic preparation of azo colorants would be possible in this simple and technically uncomplicated way through the collision of jets in a microjet reactor. The process of the invention is universally suitable for preparing azo colorants obtained in the form of a suspension or in the form of solution. The very rapid, intensive mixing of the reactants ensures rapid and complete conversion and hence constant and reproducible reaction conditions and the desired consistency of quality. Instances of clogging, such as occur in the case of the existing microreactors where solid substances are used or produced, can be reliably avoided. Scaleup is also easy, since the drastic changes in surface/volume ratios or mixing ratios that commonly occur, for example, are absent.

Inventively prepared azo colorants, particularly the azo pigments, are suitable for coloring natural or synthetic organic materials of high molecular mass, such as cellulose ethers and cellulose esters, such as ethylcellulose, nitrocellulose, cellulose acetate or cellulose butyrate, for example, natural resins or synthetic resins, such as addition-polymerization resins or condensation resins, examples being amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, and polyacrylates, polyamides, polyurethanes or polyesters, rubber, latices, casein, silicones, and silicone resins, individually or in mixtures.

In this context it is unimportant whether the high molecular mass organic compounds mentioned are in the form of plastically deformable masses, casting resins, pastes, melts or spinning solutions, paints, stains, foams, drawing inks, writing inks, mordants, coating materials, emulsion paints or printing inks. Depending on the intended use it proves advantageous to utilize the azo colorants obtained in accordance with the invention as blends or in the form of preparations or dispersions. Based on the high molecular mass organic material to be colored, the azo colorants prepared in accordance with the invention are employed in an amount of preferably from 0.05 to 30% by weight, more preferably from 0.1 to 15% by weight.

The azo pigments prepared by the process of the invention may be used for example to pigment the industrially commonplace baking varnishes from the class of alkyd-melamine resin varnishes, acrylic-melamine resin varnishes, polyester varnishes, high-solids acrylic resin varnishes, aqueous, polyurethane-based varnishes, and also two-component varnishes based on polyisocyanate-crosslinkable acrylic resins, and especially automotive metallic varnishes.

The azo colorants prepared in accordance with the invention are also suitable for use as colorants in electrophotographic toners and developers, such as one- or two-component powder toners (also called one- or two-component developers), magnetic toners, liquid toners, addition-polymerization toners, and also specialty toners.

Typical toner binders are addition-polymerization, polyaddition, and polycondensation resins, such as styrene, styrene-acrylate, styrene-butadiene, acrylate, polyester, and phenol-epoxy resins, polysulfones, polyurethanes, individually or in combination, and also polyethylene and polypropylene, which may contain further ingredients, such as charge control agents, waxes or flow aids, or may be subsequently modified with these additives.

Moreover, the azo colorants prepared in accordance with the invention are suitable for use as colorants in powders and powder coating materials, especially in triboelectrically or electrokinetically sprayable powder coating materials that are used to coat the surfaces of articles made, for example, of metal, wood, plastic, glass, ceramic, concrete, textile material, paper or rubber.

Typical powder coating resins employed are epoxy resins, carboxyl- and hydroxyl-containing polyester resins, polyurethane resins and acrylic resins, together with customary curing agents. Combinations of resins are also used. For example, epoxy resins are frequently used in combination with carboxyl- and hydroxyl-containing polyester resins. Typical curing components (depending on the resin system) are, for example, acid anhydrides, imidazoles, and also dicyandiamide and its derivatives, blocked isocyanates, bisacylurethanes, phenolic and melamine resins, triglycidyl isocyanurates, oxazolines, and dicarboxylic acids.

Moreover, the azo colorants prepared in accordance with the invention a re suitable for use as colorants in inkjet inks on an aqueous and nonaqueous basis, and also in those inks which operate in accordance with the hotmelt process.

Furthermore, the azo colorants prepared in accordance with the invention are also suitable as colorants for color filters, both for subtractive and for additive color generation.

The azo colorants prepared in accordance with the invention, particularly the azo dyes, are suitable for dyeing or printing hydroxyl-containing or nitrogenous natural organic and also synthetic substrates. Such substrates include for example synthetic or natural fiber materials and also leather materials comprising predominantly natural or regenerated cellulose or natural or synthetic polyamides. With preference they are suitable for dyeing and printing textile material based on acetate, polyester, polyamide, polyacrylonitrile, PVC, and polyurethane fibers and also wool or in particular cotton. To this end, the dyes may be applied to the textile materials by the usual exhaust, padding or printing processes.

In order to assess the properties in the coating sector of the pigments prepared in accordance with the present invention, a selection was made, from among the large number of known varnishes, of an alkyd-melamine resin varnish (AM) containing aromatics and based on a medium-oil alkyd resin and a butanol-etherified melamine resin; a polyester varnish (PE) based on cellulose acetobutyrate; a high-solids acrylic resin baking varnish based on a nonaqueous dispersion (HS); and an aqueous, polyurethane-based varnish (PUR).

The color strength and hue were determined in accordance with DIN 55986.

The millbase rheology after dispersion was evaluated on the basis of the following five-point scale:

thin fluid thick slightly set set

Following dilution of the millbase to the final pigment concentration, the viscosity was assessed using the Rossmann viscospatula type 301 from Erichsen.

Gloss measurements were carried out on case films at an angle of 20° in accordance with DIN 67530 (ASTMD 523) using the "multigloss" gloss meter from Byk-Mallinckrodt.

The solvent fastness was determined in accordance with DIN 55976.

The fastness to overcoating was determined in accordance with DIN 53221.

In the preceding text and in the following examples, parts and percentages are each by weight of the substances so described.

EXAMPLES

Example 1

An approximately 5% strength aqueous 3,3'-dichlorobenzidene tetraazo solution with a temperature of 0° C., prepared by bisdiazotizing 253 parts of 3,3'-dichlorobenzidene in dilute HCl and sodium nitrite, is pumped at 26 bar through one of two frontally opposed nozzles, each with a diameter of 300 μm, of a two-jet microjet reactor. Pumped through the second nozzle under the same pressure is an approximately 5% strength aqueous coupling component solution having a temperature of 10° C., prepared by dissolving 354 parts of acetoacetanilide in dilute sodium hydroxide solution, buffered by the addition of 164 parts of sodium acetate. The jets impinge on one another frontally in a gas atmosphere. The resulting pigment suspension is carried off by a stream of compressed air of about 700 l/h, which serves simultaneously to maintain the gas atmosphere at the collision point of the jet. The compressed air stream enters perpendicularly with respect to the two jets, through an opening in the reactor housing. The exit opening for the compressed air and the pigment suspension is situated on the opposite side to the entry opening of the compressed air stream.

About 900 parts of the resulting pigment suspension are collected, heated to 95° C., and stirred at 95° C. for 30 minutes. After the suspension has cooled to 80° C. it is filtered, the solid product is washed salt-free with water, and the presscake is dried at 95° C. for 15 h and then ground. This gives 44 parts of Pigment Yellow 12.

The pigment is used to prepare an offset printing ink with a commercially customary heatset offset varnish based on a hard resin in mineral oil. In comparison to a printing ink prepared using a commercially customary Pigment Yellow 12, the printing ink is notable for markedly higher color strength, significantly higher transparency, and higher gloss.

Example 2

Diazonium Salt Solution 729 parts of 2,5-dichloroaniline are stirred in 2074.5 parts of water and 2177.8 parts of aqueous 31% strength hydrochloric acid at room temperature for 8 h. The mixture is cooled to −10° C. by adding 1500 parts of ice. At this temperature, 770.4 parts of aqueous 40% strength sodium nitrite solution are added rapidly, and the mixture is stirred for 1 h. The diazonium salt solution is clarified by adding 50 g of Tonsil and carrying out filtration with suction. The diazonium salt solution is made up of water to a total volume of 10 liters.

Solution of the Coupling Component 1264.5 parts of Naphtol AS are introduced into and dissolved in a mixture of 9000 parts of water and 1222.2 parts of aqueous 33% sodium hydroxide solution which is at a temperature of 80° C.

Azo Coupling in the Microjet Reactor

The azo coupling takes place in the microjet reactor used in Example 1. The diazonium salt solution, at 27 bar, and the solution of the coupling component, at 31 bar, are sprayed against one another through the two nozzles, with the compressed air stream for carrying off the resulting pigment suspension being approximately 700 l/h.

The resulting pigment suspension is stirred at 40° C. for about 1 h and then filtered and the solid product is washed salt-free with water. The presscake is dried at 80° C. This gives Pigment Red 2.

The pigment is used to prepare an offset printing ink with a commercially customary heatset offset varnish based on a hard resin in mineral oil. The printing ink is notable for high color strength, transparency, and brightness.

Example 3

Diazonium Salt Solution 371 parts of 3-amino-4-methoxybenzanilide are stirred in 4500 parts of water and 808.5 parts of aqueous 31% strength hydrochloric acid for 8 h. Following the addition of 1000 parts of ice, diazotization is carried out by adding 260.7 parts of aqueous 40% strength sodium nitrite solution. Then 11 parts of a $C_{16}$–$C_{18}$ fatty alcohol ethoxylate containing 25 ethylene oxide units and 200 parts of anhydrous sodium acetate are added and the volume is made up with water to 10 liters.

Solution of the Coupling Component 600 parts of Naphtol AS-LC are introduced into 4000 parts of water at a temperature of 85° C. and are dissolved together with 502.5 parts of aqueous 33% sodium hydroxide solution. 11 parts of a methyltauride sodium salt based on plant-derived mixed fatty acids are added, the solution is made up with water to a volume of 10 liters, and the temperature is set at 65° C.

Azo Coupling in the Microjet Reactor

The azo coupling takes place in the microjet reactor used in Example 1. The diazonium salt solution and the solution of the coupling component are sprayed at 43 to 45 bar through the two nozzles against one another; the compressed air stream for carrying off the resulting pigment suspension is approximately 700 l/h. The temperature of the pigment suspension carried off is from 35 to 40° C. The resulting pigment suspension is stirred at about 40° C. for about 15 minutes and then filtered and the solid product is washed salt-free with water. The presscake is dried at 80° C. This gives Pigment Red 146.

The pigment is used to prepare a gravure printing ink with a commercially customary nitrocellulose gravure printing varnish based on a collodium wool in ethyl acetate. In comparison to a printing ink prepared with a commercially customary Pigment Red 146, the printing ink features substantially higher transparency and markedly higher gloss.

Example 4

Diazonium Salt Suspension 287.3 parts of 2-amino-4-chloro-5-methylbenzenesulfonic acid are dissolved in 2600 parts of water and 174.2 parts of aqueous 33% strength sodium hydroxide solution at 80° C. and the solution is filtered. After the solution is cooled to 40° C., 465.5 parts of aqueous 31% strength hydrochloric acid are added. The precipitation is stirred overnight at room temperature. Diazotization is carried out by adding 227.7 parts of aqueous 40% strength sodium nitrite solution. The volume of the diazonium salt suspension is adjusted to approximately 8 liters with water.

Solution of the Coupling Component 429 parts of pyrazole acid are dissolved in 2600 parts of water together with 194.2 parts of aqueous 33% strength sodium hydroxide solution. The volume of the coupling component solution is made up to approximately 8 liters with water and warmed to 53° C. by passing steam into it, and then 553.8 parts of 98% disodium hydrogen phosphate are added.

Azo Coupling in the Microjet Reactor

The azo coupling takes place in the microjet reactor used in Example 1. The diazonium salt suspension, at about 45 bar, and the solution of the coupling component, at about 34 bar, are sprayed against one another through the two nozzles, the compressed air stream for carrying off the resulting pigment suspension being approximately 1000 l/h.

1500 parts of the pigment suspension are heated to 80° C., adjusted to a pH of 2 using aqueous 25% strength hydrochloric acid, and stirred for 15 minutes. A solution at a temperature of 80° C., made up of 0.82 part of stearic acid in 10 parts of water and 3 drops of aqueous 33% strength sodium hydroxide solution, and then 30.92 parts of calcium chloride, are added. After stirring at 80° C. for 2 hours the mixture is filtered with suction and the solid product is washed first with aqueous hydrochloric acid with a pH of 2 and then with water. The presscake is dried at 80° C.

This gives 31.6 parts of Pigment Yellow 191.

Conventionally prepared Pigment Yellow 191.

The diazoinium salt suspension is prepared in accordance with Example 4a).

The solution of the coupling component is prepared in accordance with Example 4b) except that no disodium hydrogen phosphate is added.

Conventional azo coupling is carried out by adding the diazonium salt suspension dropwise to the initial charge of the 40° C. solution of the coupling component. During this addition, the pH is held at 6.3, where appropriate by parallel dropwise addition of a solution of 70.7 parts of disodium hydrogen phosphate in 400 parts of water at 80° C. into the pigment suspension which forms. Following complete addition of the diazonium salt solution, the reaction mixture is heated to 80° C. and adjusted to a pH of 2.0 using aqueous 25% strength hydrochloric acid, and then a solution of 1.1 parts of stearic acid in water and a few drops of aqueous 33% strength sodium hyrdoxide solution, and, finally, 33.3 parts of calcium chloride, are added. After stirring at 80° C. for 2 hours the reaction mixture is filtered with suction and the solid product is washed first with aqueous hydrochloric acid, with a pH of 2, and then with water.

The presscake is dried at 80° C.

This gives 41 parts of Pigment Yellow 191.

Testing in Plasticized PVC

In a commercially customary plasticized PVC test system, a transparent PVC film is produced with each of the pigments prepared in accordance with Example 4c and Example 4d. The pigment prepared inventively in accordance with Example 4c gives a strongly colored, transparent, bright, and pure PVC coloration. The pigment prepared conventionally in accordance with Example 4d cannot be dispersed satisfactorily, and the PVC film exhibits distinct specks and is weaker in color.

Example 5

An approximately 3% strength aqueous 3,3'-dichlorobenzidene tetraazo solution with a temperature of 10° C., prepared by bisdiazotizing 253 parts of 3,3'-dichlorobenzidene in dilute HCl and sodium nitrite, is pumped at 25 bar through one nozzle of the microjet reactor used in Example 1. Pumped through the second nozzle under the same pressure is an approximately 3% strength aqueous coupling component solution having a temperature of 20° C., prepared by dissolving 354 parts of acetoacetanilide in dilute sodium hydroxide solution, buffered by the addition of 164 parts of sodium acetate. The compressed air stream is approximately 700 I/h.

About 900 parts of the resulting pigment suspension are collected, heated to 95° C., and stirred at 95° C. for 2 h. After the suspension has cooled to 80° C. it is filtered, the solid product is washed salt-free with water, and the presscake is dried at 95° C. for 15 h and then ground. This gives 26 parts of Pigment Yellow 12.

The pigment is used to prepare an offset printing ink with a commercially customary heatset offset varnish based on a hard resin in mineral oil. In comparison to a printing ink prepared using a commercially customary Pigment Yellow 12, the printing ink is notable for markedly higher color strength, significantly higher transparency, and higher gloss. The particle size distribution, determined by electron microscopy, shows an average for the pigment prepared using the microjet reactor that is about 30% lower than that of the commercially customary P.Y. 12.

What is claimed is:

1. A process for preparing azo colorants which comprises spraying one or more coupling components individually or in a mixture and one or more couplable diazonium salts individually or in a mixture, in their solution or suspension form through nozzles to a point of conjoint collision in a reactor chamber enclosed by a housing in a microjet reactor, a gas or an evaporating liquid being passed into the reactor chamber through an opening in the housing for the purpose of maintaining a gas atmosphere in the reactor chamber, and the resulting product solution or suspension and the gas or the evaporated liquid being removed from the reactor through a further opening in the housing by means of overpressure on the gas entry side or underpressure on the product and gas exit side.

2. The process as claimed in claim 1, wherein the solutions or suspensions are sprayed into the reactor chamber with a pressure of at least 10 bar.

3. The process as claimed in claim 1, wherein the temperature of the solutions or suspensions is from −10 to +90° C.

4. The process as claimed in claim 1, wherein the gas is air, nitrogen or carbon dioxide.

5. The process as claimed in claim 1, wherein the azo colorant is an azo pigment selected from the group consisting of the monoazo pigments, disazo pigments, β-naphthol and Naphtol AS pigments, laked azo pigments, benzimidazolone pigments, disazo condensation pigments, and metal complex azo pigments.

6. A process as claimed in claim 1, wherein the azo colorant is an azo dye selected from the group consisting of the cationic, anionic, and nonionic azo dyes, monoazo, disazo, and polyazo dyes, metal complex azo dyes, formazan dyes, and anthraquinone azo dyes.

7. The process as claimed in claim 1, wherein the couplable diazonium salt is a diazonium salt of an amine component from the group consisting of aniline, 2-nitroaniline, methyl anthranilate, 2,5-dichloroaniline, 2-methyl-4-chloroaniline, 2-trifluoromethyl-4-chloroaniline, 2,4,5-trichloroaniline; 3-amino-4-methylbenzamide, 4-amino-3-chloro-N'-methylbenzamide, o-toluidine, o-dianisidine, 2,2',5,5'-tetrachlorobenzidine, 2-amino-5-methylbenzenesulfonic acid, and 2-amino-4-chloro-5-methylbenzenesulfonic acid, 4-methyl-2-nitrophenylamine, 4-chloro-2-nitrophenylamine, 3,3'-dichlorobiphenyl-4,4'-diamine, 3,3'-dimethylbiphenyl-4,4'-diamine, 4-methoxy-2-nitrophenylamine, 2-methoxy-4-nitrophenylamine, 4-amino-2,5-dimethoxy-N-phenylbenzenesulfonamide, dimethyl 5-aminoisophthalate, anthranilic acid, 2-trifluoromethylphenylamine, dimethyl 2-aminoterephthalate, 1,2-bis(2-aminophenoxy)ethane, 2-amino-4-chloro-5-methylbenzenesulfonic acid, 2-methoxyphenylamine, 4-(4-aminobenzoylamino) benzamide, 2,4-dinitrophenylamine, 3-amino-4-chlorobenzamide, 3-amino-4-chlorobenzoic acid, 4-nitrophenylamine, 2,5-dichlorophenylamine, 4-methyl-2-nitrophenylamine, 2-chloro-4-nitrophenylamine, 2-methyl-5-nitrophenylamine, 2-methyl-4-nitrophenylamine, 2-methyl-5-nitrophenylamine, 2-amino-4-chloro-5-methylbenzenesulfonic acid, 2-aminonaphthalene-1-sulfonic acid, 2-amino-5-chloro4-methylbenzenesulfonic acid, 2-amino-5-chloro-4-methylbenzenesulfonic acid, 2-amino-5-methylbenzenesulfonic acid, 2,4,5-trichlorophenylamine, 3-amino-4-methoxy-N-phenylbenzamide, 4-aminobenzamide, methyl 2-aminobenzoate, 4-amino-5-methoxy-2,N-dimethylbenzenesulfonamide, monomethyl 2-amino-N-(2,5-dichlorophenyl)terephthalate, butyl 2-aminobenzoate, 2-chloro-5-trifluoromethyl-phenylamine, 4-(3-amino-4-methylbenzoylamino)benzenesulfonic acid, 4-amino-2,5-dichloro-N-methylbenzenesulfonamide, 4-amino-2,5-dichloro-N,N-dimethyl-benzenesulfonamide, 6-amino-1H-quinazoline-2,4-dione, 4-(3-amino-4-methoxy-benzoylamino)benzamide, 4-amino-2,5-dimethoxy-N-methylbenzenesulfonamide, 5-aminobenzimidazolone, 6-amino-7-methoxy-1,4-dihydroquinoxaline-2,3-dione, 2-chloroethyl-3-amino-4-methylbenzoate, isopropyl 3-amino-4-chlorobenzoate, 3-amino-4-chlorobenzotrifluoride, n-propyl 3-amino-4-methylbenzoate, 2-aminonaphthalene-3,6,8-trisulfonic acid, 2-aminonaphthalene4,6,8-trisulfonic acid, 2-aminonaphthalene-4,8-disulfonic acid, 2-aminonaphthalene-6,8-disulfonic acid, 2-amino-8-hydroxynaphthalene-6-sulfonic acid, 1-amino-8-hydroxy-naphthalene-3,6-disulfonic acid, 1-amino-2-hydroxybenzene-5-sulfonic acid, 1-amino-4-acetylaminobenzene-2-sulfonic acid, 2-aminoanisole, 2-aminomethoxybenzene-ω-methanesulfonic acid, 2-aminophenol-4-sulfonic acid, o-anisidine-5-sulfonic acid, 2-(3-amino-1,4-dimethoxybenzenesulfonyl)ethyl sulfate, and 2-(1-methyl-3-amino4-methoxybenzenesulfonyl)ethyl sulfate, 2-(4-amino-benzenesulfonyl)ethyl sulfate, 2-(4-amino-5-methoxy-2-methylbenzene-sulfonyl)ethyl sulfate, 2-(4-amino-2,5-dimethoxybenzenesulfonyl)ethyl sulfate, 2-[4-(5-hydroxy-3-methylpyrazol-1-yl)benzenesulfonyl] ethyl sulfate, 2-(3-amino-4-methoxybenzene-sulfonyl)ethyl sulfate, and 2-(3-aminobenzenesulfonyl)ethyl sulfate.

8. The process as claimed in claim 1, wherein the coupling component is an acetoacetarylide of the formula (I)

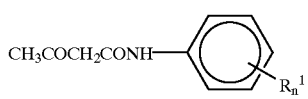

(I)

where n is a number from 0 to 3, and $R^1$ is a $C_1$–$C_4$-alkyl group; a $C_1$–$C_4$-alkoxy group; a trifluoromethyl group; a nitro group; a halogen atom; a NHCOCH$_3$ group; an SO$_3$H group; a group SO$_2$NR$^{10}$R$^{11}$ where R$^{10}$ and R$^{11}$ are identical or different and are hydrogen or $C_1$–$C_4$ alkyl; a group COOR$^{10}$; or a group COONR$^{12}$R$^{13}$ where R$^{12}$ and R$^{13}$ independently are hydrogen, $C_1$–$C_4$ alkyl or phenyl, the phenyl ring being substituted by one, two or three identical or different substituents from the group consisting of $C_1$–$C_4$ alkyl, $C_1$–$C_4$ alkoxy, trifluoromethyl, nitro, halogen, COOR$^{10}$, and COONR$^{10}$R$^{11}$, R$^{10}$ and R$^{11}$ being identical or different and being as defined above, and where n>1R$^1$ may be identical or different;

a 2-hydroxynaphthalene of the formula (II),

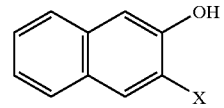

(II)

where x is hydrogen, a COOH group or a group of the formula (III), (VI) or (VII);

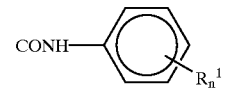

(III)

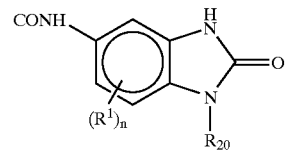

(VI)

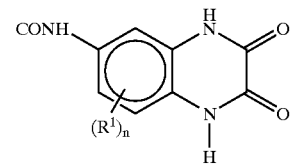

(VII)

where n and R$^1$ are as defined above; and

R$^{20}$ is hydrogen, methyl or ethyl;

or the coupling component is a bisacetoacetylated diaminophenyl or -biphenyl, it being possible for the phenyl or biphenyl ring system to be unsubstituted or substituted by 1, 2, 3 or 4 identical or different radicals CH$_3$, C$_2$H$_5$, OCH$_3$, OC$_2$H$_5$, NO$_2$, F, Cl, CF$_3$;

an acetoacetarylide of a dinuclear heterocycle of the formula (IV),

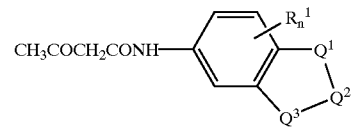

(IV)

where,

Q$^1$, Q$^2$ and Q$^3$ may be identical or different and are N, NR$^2$, CO, N—CO, NR$^2$—CO, CO—N, CO—NR$^2$, CH, N—CH, NR$^2$—CH, CH—N, CH—NR$^2$, CH$_2$, N—CH$_2$, NR$^2$—CH$_2$, CH$_2$—N, CH$_2$—NR$^2$ or SO$_2$, where R$^2$ is a hydrogen atom; is a C$_1$–C$_4$ alkyl group, or is a phenyl group which may be unsubstituted or substituted one or more times by halogen, C$_1$–C$_4$ alkyl, C$_1$–C$_4$ alkoxy, trifluoromethyl, nitro, cyano, substituted with the proviso that the combination of Q$^1$, Q$^2$ and Q$^3$ with the two carbon atoms of the phenyl ring results in a saturated or unsaturated, five- or six-membered ring; or a pyrazolone of the formula (V);

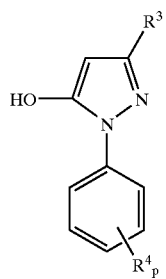
(V)

where
R³ is a CH₃, COOCH₃ or COOC₂H₅ group,
R⁴ is a CH₃ or SO₃H group or a chlorine atom, and
p is a number from 0 to 3,
and where p>1R⁴ may be identical or different,
or the coupling component is a compound selected from the group consisting of 4-[5-hydroxy-3-methylpyrazol-1-yl]benzenesulfonic acid, 2-aminonaphthalene-1,5-disulfonic acid, 5-methoxy-2-methyl4-[3oxobutrylamino]benzenesulfonic acid, 2-methoxy-5-methyl-4-[3-oxobutyrylamino]benzenesulfonic acid, 4acetylamino-2-aminobenzenesulfonic acid, 4-[4-chloro6-(3-sulfophenylamino-[1,3,5]-triazin2-yl-amino]-5-hydroxynaphthalene-2,7-disulfonic acid, 4acetylamino-5-hydroxy-naphthalene-2,7-disulfonic acid, 4-amino-5-hydroxynaphthalene-2,7-disulfonic acid, 5-hydroxy-1-[4-sulfophenyl]-1H-pyrazole3-arboxylic acid, 2-aminonaphthalene-6,8-disulfonic acid, 2amino-8-hydroxynaphthalene-6-sulfonic acid, 1-amino-8-hydroxynaphthalene3,6-disulfonic acid, 2-aminoanisole, 2-aminomethoxy-benzene-ω-methanesulfonic acid, and 1,3,5trishydroxybenzene.

9. The process as claimed in claim 1, wherein lakeable azo colorants, monoazo colorants which may be linked to give disazo condensation pigments, disazo colorants which may be extended to give disazo condensation pigments, or azo colorants which may be complexed with heavy metals are prepared by means of azo coupling reaction.

10. The process as claimed in claim 1, wherein the reactants are supplied to the microjet reactor as aqueous, aqueous-organic or organic solutions or suspensions.

11. The process as claimed in claim 1, wherein before, during or after the azo coupling reaction in the microjet reactor from 0 to 40% by weight, based on the azo colorant, of one or more auxiliaries are added selected from the group of the surfactants, nonpigmentary and pigmentary dispersants, fillers, standardizers, resins, waxes, defoamers, antidust agents, extenders, shading colorants. preservatives, drying retardants, rheology control additives, wetting agents, antioxidants, UV absorbers, and light stabilizers.

12. The process as claimed in claim 1, wherein upstream of the injection nozzles of the coupling component and/or the diazonium salt a buffer solution is added or wherein a buffer solution is supplied by being sprayed into the collision point by means of a separate jet.

13. The process as claimed in claim 1, wherein the collision point of the jets is located in a material-remote region of the reactor chamber.

14. The process as claimed in claim 1, wherein the diazonium salt solution or suspension is sprayed to a point of conjoint collision through 1, 2 or more nozzles and independently thereof the coupling component solution or suspension is sprayed to the same point through 1, 2 or more nozzles.

15. The process as claimed in claim 1, wherein the diameter of the nozzle through which the diazonium salt is sprayed is from 0.2 times to 5 times that of the nozzle through which the coupling component is sprayed.

16. The process as claimed in claim 1, wherein the solutions or suspensions are sprayed into the reaction chamber with a pressure between 50 and 5000 bar.

17. The process as claimed in claim 1, wherein the temperature of the solutions or suspensions is from −5 to +80° C.

18. The process as claimed in claim 1, wherein before, during or after the azo coupling reaction in the microjet reactor from 1 to 30% by weight, based on the azo colorant, of one or more auxiliaries are added selected from the group of the surfactants, nonpigmentary and pigmentary dispersants, fillers, standardizers, resins, waxes, defoamers, antidust agents, extenders, shading colorants, preservatives, drying retardants, rheology control additives, wetting agents, antioxidants, UV absorbers, and light stabilizers.

19. The process as claimed in claim 1, wherein the diazonium salt solution or suspension is sprayed to a point of conjoint collision through one nozzle, and independently thereof the coupling component solution or suspension is sprayed to the same point through 1, 2 or 3 nozzles.

20. The process as claimed in claim 1, wherein the diameter of the nozzle through which the diazonium salt is sprayed is from 0.3 times to 3 times that of the nozzle through which the coupling component is sprayed.

21. An azo colorant made in accordance with the process of claim 1.

* * * * *